(12) United States Patent
Li et al.

(10) Patent No.: US 12,378,389 B2
(45) Date of Patent: Aug. 5, 2025

(54) MIXED ESTER TEREPHTHALATE COMPOSITIONS USEFUL AS PLASTICIZERS

(71) Applicant: Eastman Chemical Company, Kingsport, TN (US)

(72) Inventors: Zhenpeng Li, Piney Flats, TN (US); Eric Jon Moskala, Kingsport, TN (US); Nathan Mitchell West, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 631 days.

(21) Appl. No.: 17/595,253

(22) PCT Filed: Jun. 12, 2020

(86) PCT No.: PCT/US2020/037373
§ 371 (c)(1),
(2) Date: Nov. 12, 2021

(87) PCT Pub. No.: WO2020/263594
PCT Pub. Date: Dec. 30, 2020

(65) Prior Publication Data
US 2022/0315737 A1    Oct. 6, 2022

Related U.S. Application Data

(60) Provisional application No. 62/866,736, filed on Jun. 26, 2019.

(51) Int. Cl.
*C08K 5/12* (2006.01)
*C08K 5/13* (2006.01)

(52) U.S. Cl.
CPC . *C08K 5/12* (2013.01); *C08K 5/13* (2013.01)

(58) Field of Classification Search
CPC .......... C08K 5/12; C08K 5/13; C08K 5/0016; C08K 2201/014; H01B 3/443; C08L 2203/202
See application file for complete search history.

(56) References Cited

U.S. PATENT DOCUMENTS

| | | |
|---|---|---|
| 4,489,188 A | 12/1984 | Jones et al. |
| 4,620,026 A | 10/1986 | Siegel |
| 4,950,702 A | 8/1990 | Arendt |
| 6,969,735 B1 | 11/2005 | Godwin |
| 7,208,545 B1 | 4/2007 | Brunner et al. |
| 7,973,194 B1 | 7/2011 | Kinkade et al. |

(Continued)

FOREIGN PATENT DOCUMENTS

| | | |
|---|---|---|
| EP | 3 333 219 A1 | 6/2018 |
| EP | 3 473 669 A1 | 4/2019 |
| EP | 3 476 890 A1 | 5/2019 |
| JP | H0350246 A | 3/1991 |
| JP | H05339413 A | 12/1993 |
| JP | 11 302445 | 11/1999 |
| RU | 2015/156846 A | 7/2017 |

(Continued)

OTHER PUBLICATIONS

Conn, R. C., et al.; "Some Aromatic Esters of the Monoalkyl Ethers of Ethylene Glycol and Diethylene Glycol"; Journal of the American Chemical Society, 54(11), 1932, pp. 4370-4372.

(Continued)

*Primary Examiner* — Jiangtian Xu
(74) *Attorney, Agent, or Firm* — Polly C. Owen

(57) ABSTRACT

The present application discloses mixed ester terephthalate plasticizer compositions comprising: a compound of formula (I):, a compound of formula (II):, and a compound of formula (III):, wherein R1, R2, and n are defined herein. The present application also discloses resin compositions, insulation layers and cables comprising the plasticizer compositions.

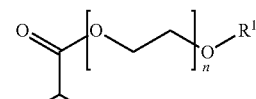

I

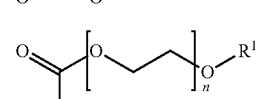

II

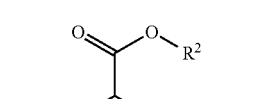

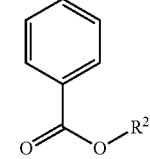

III

20 Claims, No Drawings

(56) References Cited

U.S. PATENT DOCUMENTS

| | | | |
|---|---|---|---|
| 9,403,965 B2 | 8/2016 | Laufer et al. | |
| 2008/0058450 A1* | 3/2008 | Stimpson | C08K 5/12 |
| | | | 524/296 |
| 2012/0181056 A1 | 7/2012 | Chaudhary et al. | |
| 2013/0062094 A1 | 3/2013 | Naert et al. | |
| 2015/0112008 A1 | 4/2015 | Patiul et al. | |
| 2016/0096350 A1 | 4/2016 | Lu | |
| 2016/0159051 A1* | 6/2016 | Lu | B32B 17/10761 |
| | | | 428/515 |
| 2016/0159057 A1 | 6/2016 | Butler | |
| 2016/0160005 A1 | 6/2016 | Lu et al. | |
| 2016/0160030 A1 | 6/2016 | Chen et al. | |
| 2018/0105673 A1* | 4/2018 | Schilling, III | C08K 5/12 |
| 2019/0359789 A1* | 11/2019 | Pfeiffer | C08K 5/12 |
| 2022/0185989 A1* | 6/2022 | DeLoach | C08K 5/0016 |
| 2022/0325068 A1 | 10/2022 | DeLoach et al. | |

FOREIGN PATENT DOCUMENTS

| | | |
|---|---|---|
| RU | 2 633 963 C2 | 10/2017 |
| WO | WO 2007/021987 A1 | 2/2007 |
| WO | WO 2009/085453 A2 | 7/2009 |
| WO | WO 2016094203 A1 | 6/2016 |

OTHER PUBLICATIONS

Ram, A. and Schneider, Z; "Flow Properties of PVC Plastisols"; Industrial & Engineering Chemistry Product Research and Development, 9(3); Sep. 1, 1970; pp. 286-291.

Sears, J. K. and Darby, J. R.; "The Technology of Plasticizers" 1982; pp. 104-107.

Co-pending U.S. Appl. No. 17/595,250, filed Nov. 12, 2021; Pinguan Zheng et al.

Co-pending U.S. Appl. No. 17/595,327, filed Nov. 15, 2021; Joseph Alexander DeLoach and Curtis Louis Schilling, III.

Co-pending U.S. Appl. No. 17/594,972, filed Nov. 4, 2021; Xhenpeng Li and Eric Jon Moskala.

Co-pending U.S. Appl. No. 17/594,969, filed Nov. 4, 2021; Joseph Alexander DeLoach et al.

Notification of Transmittal of the International Search Report and the Written Opinion of the International Searching Authority with Date of Mailing of Oct. 9, 2020 received in International Application No. PCT/US2020/037373.

Notification of Transmittal of the International Search Report and the Written Opinion of the International Searching Authority with Date of Mailing of Oct. 9, 2020 received in International Application No. PCT/US2020/037369.

Notification of Transmittal of the International Search Report and the Written Opinion of the International Searching Authority with Date of Mailing of Oct. 9, 2020 received in International Application No. PCT/US2020/037375.

Notification of Transmittal of the International Search Report and the Written Opinion of the International Searching Authority with Date of Mailing of Oct. 9, 2020 received in International Application No. PCT/US2020/037361.

Notification of Transmittal of the International Search Report and the Written Opinion of the International Searching Authority with Date of Mailing of Oct. 9, 2020 received in International Application No. PCT/US2020/037365.

Tan Jihuai et al: "Highly efficient and recyclable catalysts SnC12-Xh3pw12040/ac WITH Bronsted and Lewis acid sites for terephthalic acid esterification", Journal of the Taiwan Institute of Chemical Engineers, Elsevier, Amsterdam, NL; vol. 86, Mar. 31, 2018, pp. 18-24, Mar. 31, 2018.

Malik Sameena N et al: "Treatment of pharmaceutical industrial wastewater by nano-catalyzed ozonation in a semi-batch reactor for improved biodegradability", Science of the Total Environment vol. 678; Apr. 17, 2019; pp. 114-122.

Non-Final Office Communication received in U.S. Appl. No. 17/595,250 dated Jun. 10, 2024.

Non-Final Office Communication received in U.S. Appl. No. 17/595,327 dated Jun. 3, 2024.

\* cited by examiner

MIXED ESTER TEREPHTHALATE COMPOSITIONS USEFUL AS PLASTICIZERS

BACKGROUND OF THE INVENTION

Plasticizer selection for electrical wire insulation is dependent upon the performance specifications of the insulation material and the jacketing or conductive covering. Performance specifications and tests such as accelerated aging tests, and the like, are well known in the art and are described by the Underwriters Laboratory methods, e.g., UL 83. Conductive insulation with the 90° C. or 105° C. rating must, for example, retain minimum tensile properties after being aged for 136° C. under UL 83.

The typical class of plasticizer used for 90° C. or 105° C. rating for conductive insulation is the trimellitate ester plasticizer class. Trimellitate esters are used as plasticizers where greater permanence is required. The permanence is achieved because of low migration and low volatility of the trimellitate esters. Examples of trimellitate esters used in the art are tri-2-ethylhexyl trimellitate ("TOTM") and trii-sononyl trimellitate ("TINTM"). Although the trimellitate esters provide good performance, they are typically more costly. Additionally, trimellitate esters are more difficult to process in PVC formulations as compared to phthalate ester based PVC formulations. The trimellitate ester PVC formulations also have high dry times.

Applicants have provided a mixed ester terephthalate based PVC formulation system exhibiting higher tensile strength retention and lower dry times as compared to trimellitate esters such as TOTM and TINTM.

SUMMARY OF THE INVENTION

The present application discloses a plasticizer composition comprising:

greater than 40 wt % of a compound of formula I:

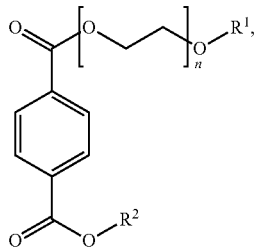

greater than 40 wt % of a compound of formula II:

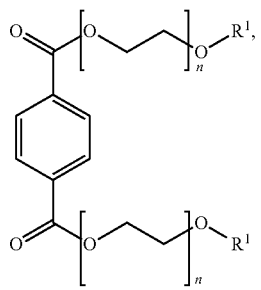

and 5 to 15 wt % of a compound of formula III:

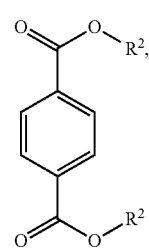

wherein:
each $R^1$ is independently $(C_{1-9})$alkyl;
each $R^2$ is independently $(C_{3-9})$alkyl; and
each n is independently 1, 2 or 3.

The present application also discloses a plastisol composition comprising the plasticizer composition disclosed herein. The present application also discloses insulation layers formed from the plastisol composition disclosed herein, and the present application discloses a cable formed from a conductor and the insulation layer disclosed herein.

DETAILED DESCRIPTION OF THE INVENTION

Definitions

As used herein, the terms "a," "an," and "the" mean one or more.

"Stabilizer" means any additive added to a formulation that can prevent that helps to prevent the formulation from degrading. Classes of stabilizers include antioxidants, light stabilizers, acid scavengers, heat stabilizers, flame retardants, and biocides.

Antioxidants are chemicals used to interrupt degradation processes during the processing of materials. Antioxidants are classified into several classes, including primary antioxidant, and secondary antioxidant.

"Primary antioxidants" are antioxidants that act by reacting with peroxide radicals via a hydrogen transfer to quench the radicals. Primary antioxidants generally contain reactive hydroxy or amino groups such as in hindered phenols and secondary aromatic amines. Examples of primary antioxidants include Cyanox™ 1790, 2246, and 425; Topanol® CA (4-[4,4-bis(5-tert-butyl-4-hydroxy-2-methylphenyl)butan-2-yl]-2-tert-butyl-5-methylphenol), Irganox™ 1010, 1076, 1726, 245, 1098, 259, and 1425; Ethanox™ 310, 376, 314, and 330; Evernox™ 10, 76, 1335, 1330, 3114, MD 1024, 1098, 1726, 120. 2246, and 565; Anox™ 20, 29, 330, 70, IC-14, and 1315; Lowinox™ 520, 1790, 221646, 22M46, 44625, AH25, GP45, CA22, CPL, HD98, TBM-6, and WSP; Naugard™ 431, PS48, SP, and 445; Songnox™ 1010, 1024, 1035, 1076 CP, 1135 LQ, 1290 PW, 1330FF, 1330PW, 2590 PW, and 3114 FF; and ADK Stab AO-20, AO-30, AO-40, AO-50, AO-60, AO-80, and AO-330.

"Phenolic antioxidants" are primary antioxidants having at least one phenolic moiety. Non-limiting examples include Cyanox 1790, Cyanox 2246, Cyanox 425, Ethanox 330, Irganox 1330, Irganox 245, Irganox 259, Irganox 1010, Irganox 1035, Irganox 1076, Irganox 1098, Irganox 1425, Irganox 3114, and Topanol CA.

"Secondary antioxidants" are often called hydroperoxide decomposers. They act by reacting with hydroperoxides to decompose them into nonreactive and thermally stable products that are not radicals. They are often used in conjunction with primary antioxidants. Examples of secondary antioxidants include the organophosphorous (e.g., phosphites, phosphonites) and organosulfur classes of compounds. The phosphorous and sulfur atoms of these compounds react with peroxides to convert the peroxides into alcohols. Examples of secondary antioxidants include Ultranox 626, Ethanox™ 368, 326, and 327; Doverphos™ LPG11, LPG12, DP S-680, 4, 10, S480, and S-9228; Evernox™ 168 and 626; Irgafos™ 126 and 168; Weston™ DPDP, DPP, EHDP, PDDP, TDP, TLP, and TPP; Mark™ CH 302, CH 55, TNPP, CH66, CH 300, CH 301, CH 302, CH 304, and CH 305; ADK Stab 2112, HP-10, PEP-8, PEP-36, 1178, 135A, 1500, 3010, C, and TPP; Weston 439, DHOP, DPDP, DPP, DPTDP, EHDP, PDDP, PNPG, PTP, PTP, TDP, TLP, TPP, 398, 399, 430, 705, 705T, TLTTP, and TNPP; Alkanox 240, 626, 626A, 627AV, 618F, and 619F; and Songnox™ 1680 FF, 1680 PW, and 6280 FF.

"Acid scavengers" are additives that neutralize acids formed during the processing of polymers. Examples of acid scavengers include Hycite 713; Kisuma DHT-4A, DHT-4V, DHT-4A-2, DHT-4C, ZHT-4V, and KW2200; Brueggemann Chemical Zinc Carbonate RAC; Sipax™ AC-207; calcium stearate; Baerlocher GL 34, RSN, GP, and LA Veg; Licomont CAV 102; FACI Calcium Stearate DW, PLC, SP, and WLC; Hangzhou Hitech Fine Chemical: CAST, and ZnST; Songstab™ SC-110, SC-120, SC-130, SM-310, and SZ-210; Sun Ace SAK-CS, SAK-DSC, SAK-DMS, SAK-DZS, and SAK-KS; US Zinc Zinc Oxide 201, 205 HAS, 205H, 210, and 210E; Drapex™ 4.4, 6.8, 39, 391, 392, and 392S; Vikoflex™ 4050, 5075, 7170, 7190, 7040, 9010, 9040, and 9080; Joncryl™ ADR 4468, and ADR 4400; Adeka CIZER D-32; Epon™ 1001F, 1002F, and 1007F; Aralidite™ ECN 1299, 1273, 1280, 1299, and 9511; Dynamar RC 5251Q; and Nexamite PBO.

A "salt stabilizer" can be incorporated into the composition to stabilize the composition during processing. The cation component of the salt stabilizer is chosen from aluminum, calcium, magnesium, copper, cerium, antimony, nickel, cobalt, manganese, barium, strontium, zinc, zirconium, tin, cadmium, chromium and iron cations; and the anion component of the salt stabilizer is an $(C_{6-20})$alicyclic carboxylic acid, a $(C_{2-20})$alkyl carboxylic acid, or a $(C_{6-20})$ alkenyl carboxylic acid. Examples of the $(C_{6-20})$alicyclic carboxylic acid, the $(C_{6-20})$alkyl carboxylic acid, or the $(C_{6-20})$alkenyl carboxylic acid include naphthenic acid, abietic acid, cyclohexane carboxylic acid, cyclohexane propionic acid, 3-methyl-cyclopentyl acetic acid, 4-methylcyclohexane carboxylic acid, 2,2,6-trimethylcyclohexane carboxylic acid, 2,3-dimethylcyclopentyl acetic acid, 2-methylcyclopentyl propionic acid, palmitic acid, stearic acid, oleic acid, lauric acid, and the like. Examples of the salt stabilizers include strontium naphthenate, copper naphthenate, calcium naphthenate, zinc naphthenate, magnesium naphthenate, copper abietate, magnesium abietate, titanium acetate, titanium propionate, titanium butyrate, antimony acetate, antimony propionate, antimony butyrate, zinc acetate, zinc propionate, zinc butyrate, tin acetate, tin propionate, tin butyrate, 2-ethylhexylamine, bis(2-ethylhexyl) amine, tetrabutyl phosphonium bromide, dodecyldimenylamine, N,N-dimentylbenzylamine, tetramethyl guanidine, benzyltimethyl ammonium hydroxide, tetrabutyl ammonium hydroxide, 2-ethylimidazole, DBU/2-ethylheaxnoic acid, aluminum acetylacetonate, aluminate lactate, bismuth octoate, calcium octoate, cerium naphthenate, chromium(III) 2-ethylhexanoate, cobalt octoate, copper II acetylacetonate, Iron (III) acetylacetonate, manganese naphthenate, nickel acetylacetonate, stannous octoate, zinc acetate, zinc acetylacetonate, zinc octoate, zirconium octoate, and the like.

"Flame retardant" are materials that increase ignition time, reduce flame spreading and rate of burning. The flame retardant should have a high decomposition temperature, low volatility, a minimum effect on thermal and mechanical properties and good resistance to light and ultra-violet radiation. Examples of flame retardants that may be used include halogen containing compounds and phosphorous containing organic compounds such as triaryl, trialkyl or alkyl diaryl phosphate esters. Other materials that may be used include chloroparaffins, aluminum trihydrate, antimony oxides, or zinc broate.

"Fillers" are materials added to formulations or compositions primarily to reduce cost, increase the output of dry blending, increase electrical resistance, increase resistance to ultra-violet light, increase hardness, provide improved heat transmission, and to increase the resistance of heat deformation. Fillers can also impact anti-blocking or anti-slip performance of the compositions. Nonlimiting examples of fillers included calcium carbonate, clays, silica, dolomite, bauxite, titanium dioxide. The particular particle size distribution and average surface area of the filler will be chosen according to the properties it is desired to impart, as would be apparent to one of skill in the art.

"Processing aids" are chemicals that reduce the adhesion of the compositions with machinery surfaces during processing. The lubricants also affect the frictional properties between the polymer resin particles during processing. Non-limiting examples of lubricants include stearic acid, metal stearates, waxes, silicon oil, mineral oil, and synthetic oils.

As used herein the term "chosen from" when used with "and" or "or" have the following meanings: A variable chosen from A, B and C means that the variable can be A alone, B alone, or C alone. A variable A, B, or C means for example that the variable can be A alone, B alone, C alone, A and B in combination, A and C in combination, B and C in combination, or A, B, and C in combination.

"Alkyl" groups suitable for use herein can be straight, branched, or cyclic, and can be saturated or unsaturated. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. "Alkylene" is a bivalent alkyl group.

Mixed ester terephthalates prepared from condensation of terephthalate derivatives with alkyl-started oligo-alkylene alcohols and alkyl-carboxylic acid derivatives have been shown to display unexpected advantages of lower viscosity than certain trimellitate (e.g., TOTM, TINTM) based plasticizers typically used for heat stable insulator applications. The mixed ester terephthalate disclosed in the current application when used to prepare resin-based insulators have improved initial tensile strength, improved tensile strength retention, improved initial tensile strength, and improved drying time as compared to trimellitate-resin based insulators.

Plasticizer Composition

The present application discloses a plasticizer composition comprising:

greater than 40 wt % of a compound of formula I:

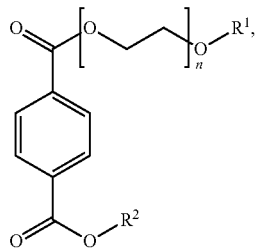

greater than 40 wt % of a compound of formula II:

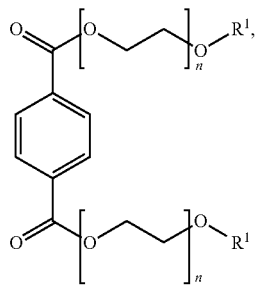

and 5 to 15 wt % of a compound of formula III:

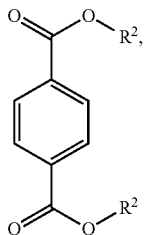

wherein: each $R^1$ is independently an unbranched or branched $(C_{1-9})$alkyl; each $R^2$ is independently an unbranched or branched $(C_{3-9})$alkyl; and each n is independently 1, 2 or 3.

In one embodiment, each $R^1$ is independently chosen from methyl, ethyl, propyl, butyl, pentyl, hexyl, heptyl, octyl, or nonyl. In one class of this embodiment, each n is 1. In one class of this embodiment, each n is 2. In one class of this embodiment, each n is 3.

In one embodiment, each $R^1$ is independently chosen from methyl. In one class of this embodiment, each n is 1. In one class of this embodiment, each n is 2. In one class of this embodiment, each n is 3.

In one embodiment, each $R^1$ is independently ethyl. In one class of this embodiment, each n is 1. In one class of this embodiment, each n is 2. In one class of this embodiment, each n is 3.

In one embodiment, each $R^1$ is independently propyl. In one class of this embodiment, each n is 1. In one class of this embodiment, each n is 2. In one class of this embodiment, each n is 3.

In one embodiment, each $R^1$ is independently butyl. In one class of this embodiment, each n is 1. In one class of this embodiment, each n is 2. In one class of this embodiment, each n is 3.

In one embodiment, each $R^1$ is independently pentyl. In one class of this embodiment, each n is 1. In one class of this embodiment, each n is 2. In one class of this embodiment, each n is 3.

In one embodiment, each $R^1$ is independently hexyl. In one class of this embodiment, each n is 1. In one class of this embodiment, each n is 2. In one class of this embodiment, each n is 3.

In one embodiment, each $R^1$ is independently heptyl. In one class of this embodiment, each n is 1. In one class of this embodiment, each n is 2. In one class of this embodiment, each n is 3.

In one embodiment, each $R^1$ is independently octyl. In one class of this embodiment, each n is 1. In one class of this embodiment, each n is 2. In one class of this embodiment, each n is 3.

In one embodiment, each $R^1$ is independently nonyl. In one class of this embodiment, each n is 1. In one class of this embodiment, each n is 2. In one class of this embodiment, each n is 3.

In one embodiment, each $R^2$ is independently chosen from propyl, butyl, pentyl, hexyl, heptyl, octyl, or nonyl. In one class of this embodiment, each n is 1. In one class of this embodiment, each n is 2. In one class of this embodiment, each n is 3.

In one embodiment, each $R^2$ is independently chosen from butyl, octyl, or nonyl. In one class of this embodiment, each n is 1. In one class of this embodiment, each n is 2. In one class of this embodiment, each n is 3.

In one embodiment, each $R^2$ is independently chosen from butyl, or octyl. In one class of this embodiment, each n is 1. In one class of this embodiment, each n is 2. In one class of this embodiment, each n is 3.

In one embodiment, each $R^2$ is butyl. In one class of this embodiment, each n is 1. In one class of this embodiment, each n is 2. In one class of this embodiment, each n is 3.

In one embodiment, each $R^2$ is octyl. In one class of this embodiment, each n is 1. In one class of this embodiment, each n is 2. In one class of this embodiment, each n is 3. In one class of this embodiment, the octyl is 2-ethylhexyl.

In one embodiment, each n is 1. In one embodiment, each n is 2. In one embodiment, each n is 3.

In one embodiment, the compound of formula I is

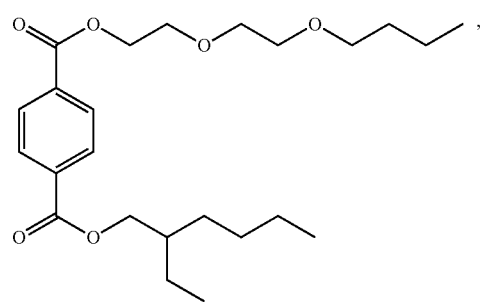 [SMILES: CCCCOCCOCCOC(=O)c1ccc(C(=O)OCC(CC)CCCC)cc1]

the compound of formula II is

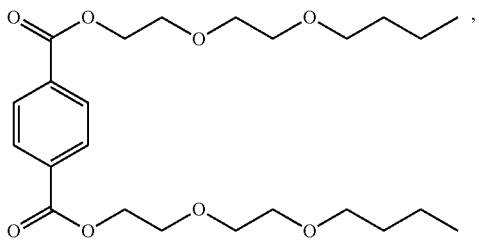 [SMILES: CCCCOCCOCCOC(=O)c1ccc(C(=O)OCCOCCOCCCC)cc1]

and the compound of formula III is

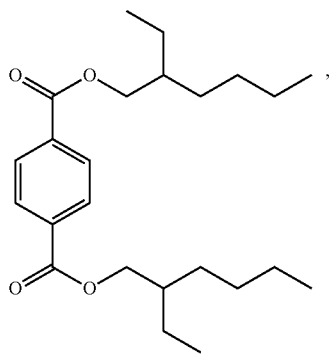 [SMILES: CCCCC(CC)COC(=O)c1ccc(C(=O)OCC(CC)CCCC)cc1]

Resin Composition

The present application also discloses a resin composition comprising: (I) a resin; and (II) a plasticizer composition comprising: greater than 40 wt % of a compound of formula I:

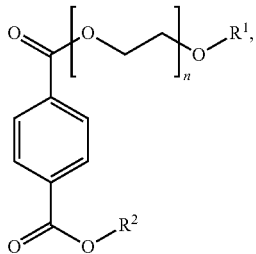

greater than 40 wt % of a compound of formula II:

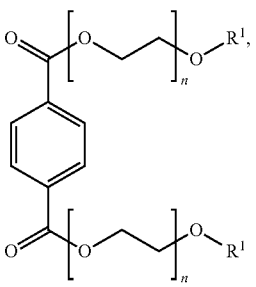

and 5 to 15 wt % of a compound of formula III:

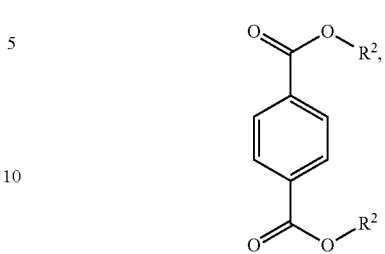

wherein: each $R^1$ is independently $(C_{1-9})$alkyl; each $R^2$ is independently $(C_{3-9})$alkyl; and each n is independently 1, 2 or 3.

In one embodiment, the composition further comprises a primary antioxidant. In one class of this embodiment, the primary antioxidant is present from 0.05 to 0.3 phr relative to the sum total of the resin. In one subclass of this class, the primary antioxidant is a phenolic antioxidant. In one sub-subclass of this subclass, the phenolic antioxidant is chosen from tris(4-tert-butyl-3-hydroxy-2,6-dimethylbenzyl) isocyanurate (e.g., Cyanox 1790); 2,2'-methylenebis(4-methyl-6-tert-butylphenol) (e.g., Cyanox 2246); 2,2'-methylenebis (4-ethyl-6-tert-butylphenol) (e.g., Cyanox 425); 1,3,5-trimethyl-2,4,6-tris(3,5-di-tert-butyl-4-hydroxybenzyl) benzene (e.g., Ethanox 330); 3,3',3',5,5',5'-hexa-tert-butyl-a,a',a'-(mesitylene-2,4,6-triyl)tri-p-cresol (e.g., Irganox 1330); ethylene bis(oxyethylene) bis-(3-(5-tert-butyl-4-hydroxy-m-tolyl)propionate) (e.g., Irganox 245); hexamethylene bis[3-(3,5-di-tert-butyl-4-hydroxyphenyl)propionate] (e.g., Irganox 259); pentaerythritol tetrakis(3-(3,5-di-tert-butyl-4-hydroxyphenyl)propionate) (e.g., Irganox 1010); thiodiethylene bis[3-(3,5-di-tert-butyl-4-hydroxyphenyl) propionate] (e.g., Irganox 1035); octadecyl 3-(3,5-di-tert-butyl-4-hydroxyphenyl)propionate (e.g., Irganox 1076); N,N'-1,6-hexanediylbis[3,5-bis(1,1-dimethylethyl)-4-hydroxy-benzenepropanamide (e.g., Irganox 1098); phosphonic acid, [[3,5-bis(1,1-dimethylethyl)-4-hydroxyphenyl] methyl]-, monoethyl ester, calcium salt (2:1) (e.g., Irganox 1425); 1,3,5-tris(3,5-di-tert-butyl-4-hydroxybenzyl)-1,3,5-triazine 2,4,6(1H,3H,5H)-trione (e.g., Irganox 3114); or 1,1,3-tris(2-methyl-4-hydroxy-5-tert-butylphenyl)butane (e.g., Topanol CA). In one sub-sub-subclass of this sub-subclass, the phenolic antioxidant is 1,1,3-tris(2-methyl-4-hydroxy-5-tert-butylphenyl)butane.

In one embodiment, the composition further comprises other components chosen from a filler, a flame retardant, a stabilizer, a pigment, a processing aid, another plasticizer, or combinations. The composition can also include other additives known to one of skill in the art. The choice of the additive will be chosen according to the desired properties needed for the composition.

In one class of this embodiment, the filler comprises calcium carbonate, fly ash, or combinations thereof, and wherein the stabilizer comprises a metal soap, an epoxidized oil, an epoxidized fatty acid ester, an organotin compound, or combinations thereof. In one class of this embodiment, the filler is chosen from calcium carbonate, magnesium carbonate, silica, clay, mica, graphite, zinc oxide, titanium dioxide or combinations. In one subclass of this class, the filler is present in an amount up to 75 phr based on the 100 phr of resin.

In one embodiment, the resin comprises a polyvinyl chloride, a polyvinyl acetate, an acrylic polymer, vinyl chloride-containing copolymers or combinations thereof. In one class of this embodiment, the resin is polyvinyl chloride.

In one embodiment, wherein the resin composition is molded into 0.762 mm thick die C cut specimen and exposed to a temperature of 136° C. for 168 hours, in an atmosphere of circulated air as tested according to UL 2556, has a tensile strength retention of at least 80%, as compared to that of an unexposed control of the same composition and shape, wherein the tensile strength is determined according to ASTM D 412 at a 500 mm/min pulling rate. In one class of this embodiment, the resin of the resin composition is a polyvinyl chloride.

In one class of this embodiment, the tensile strength retention is at least 85%. In one class of this embodiment, the tensile strength retention is at least 90%. In one class of this embodiment, the tensile strength retention is at least 95%. In one class of this embodiment, the tensile strength retention is at least 97%.

In one class of this embodiment, the resin composition has a dry time of less than 3 min as measured according to ASTM 2396-94. In one subclass of this class, the dry time is less than 2.5 min. In one subclass of this class, the dry time is less than 2.0 min.

In one subclass of this class, when the resin composition is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate.

In one sub-subclass of this subclass, the elongation at break retention is at least 90%. In one sub-subclass of this subclass, the elongation at break retention is at least 95%. In one sub-subclass of this subclass, the elongation at break retention is at least 97%.

In one embodiment, the resin composition has a dry time of less than 3 min as measured according to ASTM 2396-94. In one class of this embodiment, the dry time is less than 2.5 min. In one class of this embodiment, the dry time is less than 2.0 min. In one class of this embodiment, the resin of the resin composition is a polyvinyl chloride.

In one embodiment, when the resin composition is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate. In one class of this embodiment, the resin of the resin composition is a polyvinyl chloride.

In one class of this embodiment, the elongation at break retention is at least 90%. In one class of this embodiment, the elongation at break retention is at least 95%. In one class of this embodiment, the elongation at break retention is at least 97%.

Cable

The present application discloses an insulation layer formed from any of the previously described compositions.

The present application also discloses a cable comprising a conductor; and an insulation layer surrounding the conductor, the insulation layer formed from any of the previously described resin compositions.

The cables can be formed in a variety of configurations including as single-core cables, multi-core cables, tray cables, inter-locked armored cables, and continuously corrugated welded cable constructions. The conductors in such cables can be surrounded by one or more insulation layers and/or jacket layers. In one embodiment, at least one of these insulation layers or jacket layers can be formed with the disclosed composition.

The conductor, or conductive element, of a cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 1 kcmil conductor to a 1,500 kcmil conductor in certain embodiments, a 4 kcmil conductor to a 1,000 kcmil conductor in certain embodiments, a 50 kcmil conductor to a 500 kcmil conductor in certain embodiments, or a 100 kcmil conductor to a 500 kcmil conductor in certain embodiments. The voltage class of a cable including such conductors can also be selected. For example, a cable including a 1 kcmil conductor to a 1,500 kcmil conductor and an insulating layer formed from a suitable thermoset composition can have a voltage class ranging from about 1 kV to about 150 kV in certain embodiments, or a voltage class ranging from about 2 kV to about 65 kV in certain embodiments. In certain embodiments, a cable can also meet the medium voltage electrical properties of ICEA test standard S-94-649-2004.

EXAMPLES

Abbreviations

Comp is composition; Compar is comparative or comparator; DB is (2-butoxyethoxy)ethoxy or (2-butoxyethoxy)ethan-1-ol; DBTP is dibutyl terephthalate; EB is 2-butoxyethyl or 2-butoxyethan-1-ol; 2EH is 2-ethylhexyl or 2-ethylhexanol; PVC is polyvinylchloride, homo- or copolymer; TP is terephthalate; TOTM is tris(2-ethylhexyl) trimellitate;

TABLE 1

Structures of Ex 1-1, 1-2, and 1-3.

| Ex # | Structure |
|------|-----------|
| 1-1  | |
| 1-2  | |

TABLE 1-continued

Structures of Ex 1-1, 1-2, and 1-3.

| Ex # | Structure |
|---|---|
| 1-3 | (structure: terephthalate diester with 2-ethylhexyl groups on both sides) |

Preparation of Comp 1

Dimethyl terephthalate, DMT (388.4 g, 2.0 mol), 2-(2-butoxyethoxy)ethanol, DB (405.6 g, 2.5 mol), 2-ethylhexanol, 2-EH (325.6 g, 2.5 mol), and titanium tetraisopropoxide (0.56 g, 1.97 mmol) were added to a flask. The flask was equipped with a packed distillation column, vapor dividing head, condenser, fraction cutter, and receiver. The reaction mixture was heated to reflux under an $N_2$ atmosphere to maintain a vapor temperature of at least 65° C. to remove methanol from the reaction. The reaction mixture was refluxed and MeOH was collected (~120 mL). The reaction mixture was added to a flask and heated (90° C.) and 2.5% NaOH (300 g) was added to the mixture. Then the mixture was heated (90° C.) for 30 min. Then the aqueous layer was removed. The organic layer was washed with deionized water (300 g). Then the organic layer was concentrated in vacuo (~3 mmHg, 150° C.). The concentrated material was steam stripped for 1 h at 150° C. at 50 mmHg. The concentrated material was then subjected to low atmospheric pressure (~3 mmHg) at 150° C. for to dry the material. The concentrated material was treated with activated carbon (2 g) and stirred for 1 h. The material was then filtered through diatomaceous earth to yield Comp 1.

The ratio of Comp 1 was determined by gas chromatography (GC) by comparing the relative area % of the three products. The GC samples were run using an HP-1 column (50 m×0.2 mm×50 um) with an inlet temperature of 280° C. and an oven temperature ramp profile of a 2 min hold at 80° C. followed by a ramp of 20° C./min from 80° C. to 200° C., a 2 min hold at 200° C., a 20° C./min ramp to 280° C. and a 16 min hold at 280° C. The relative ratio of esters in the composition was Ex 1-1 (49.1%), Ex 1-2 (18.5%), and Ex 1-3 (32.4%), as further described in Table 2.

The compositions (Comp 2-6) in Table 2 were synthesized by adapting the procedure for the preparation of Comp 1. The wt %, retention time on the GC column, and M+ are provided for each component in the compositions.

TABLE 2

| | | GC Determined Composition | | |
|---|---|---|---|---|
| Comp # | Starting Materials (Ratios) | Mixed Ester (wt %, tR) M+ | Glycol Ester (wt %, tR) M+ | Alkyl Ester (wt %, tR) M+ |
| 1 | 2-(2-butoxyethoxy)ethan-1-ol, 2-ethylhexan-1-ol, Dimethyl terephthalate (1.25:1.25:1) | Ex 1-1 (48.6, 22.8 min, 422.3) | Ex 1-2 (18.2, 27.9, min, 454.2) | Ex 1-3 (33.2, 19.3 min, 370.3) |
| 2 | 2-(2-butoxyethoxy)ethan-1-ol, 2-ethylhexan-1-ol, Dimethyl terephthalate (2.25:0.75:1) | Ex 1-1 (43.4, 22.8 min, 422.3) | Ex 1-2 (44.9, 27.9, 454.2) | Ex 1-3 (10.9, 19.3 min, 370.3) |

Table 3 provides the PVC formulations for Comparative PVC Comp 1 and 2, and PVC Comp 1-3. The components of the formulations were mixed in a Flackteck Speedmixer. The PVC formulations were, as needed, used to prepare films used in the following studies or studied for their properties. The plaques were made by subjecting the formulations to a two-roll mill at 190° C. and subsequently pressed into 35 mil (~0.889 mm) plaques using a Carver press. The plaques (or films) were examined by eye for quality control.

TABLE 3

Plasticizer-PVC Formulations

| Formulation Components | Comparative PVC Comp 1 | Comparative PVC Comp 2 | PVC Comp 1 | PVC Comp 2 | PVC Comp 3 |
|---|---|---|---|---|---|
| OxyVinyls 240 PVC (phr) | 100 | 100 | 100 | 100 | 100 |
| DIDP (phr) | 47 | | | | |
| DUP (phr) | | 47 | | | |
| Comp 1 (phr) | | | 47 | | |
| Comp 2 (phr) | | | | 47 | |
| Comp 2:TOTM (1:1) (phr) | | | | | 47 |
| Topanol CA (phr) | 0.14 | 0.14 | 0.14 | 0.14 | 0.14 |
| Burgess 30P ® Calcined Clay (phr) | 12 | 12 | 12 | 12 | 12 |
| Hubercarb ® G35 $CaCO_3$ (phr) | 8 | 8 | 8 | 15 | 8 |
| Naftosafe ™ PKP 314 heat stabilizer (phr) | 5 | 5 | 5 | 5 | 5 |
| Naftochem CG 301 $Sb_2O_3$ (phr) | 2.5 | 2.5 | 2.5 | 2.5 | 2.5 |

Included in Table 4 are the viscosities of Comparative PVC Comp 1 and 2 and PVC Comp 1 and 2. The viscosities were determined using an AR 2000 rotational rheometer. The measurements were taken at 25° C. with a 40 mm aluminum parallel plate.

Lower dry time can lead to the reduction in compounding time and increase in productivity for compounding process. As shown in Table 4, PVC Comp 1 and 2 showed much lower dry times than Comparative PVC Comp 1 and 2, which can be attributed to their low viscosity and high polarity. The dry times were determined according to ASTM D2396-94.

Higher efficiency can allow formulators to reduce plasticizer amount or increase filler loading to achieve the optimal cost-performance profile. Lower plasticizer loading can also help to improve flame retardancy and insulation resistance of the final insulation compounds. The shore A hardness of films formed from Comparative PVC Comp 1-3 and PVC Comp 1-3 are shown in Table 4. PVC Comp 1 and 2 showed exhibited much better plasticizing efficiency as measured by Shore A hardness than Comparative PVC Comp 1 and 2, which can improve the processability of PVC compound in extrusion process. Regarding Comparative PVC Comp 3 and PVC Comp 3, PVC Comp 3, containing TOTM/Comp 2 (1:1), showed a reduced Shore A hardness than Comparative PVC Comp 3, which contains TOTM, only, as a plasticizer. The Shore A hardness was for each determined according to ASTM 2240-15.

TABLE 4

Viscosity, dry time of PVC dry blends and Shore A hardness of films formed from the PVC dry blends.

| Properties | PVC Formulations | | | | | |
|---|---|---|---|---|---|---|
| | Compar PVC Comp 1 | Compar PVC Comp 2 | Compar PVC Comp 3 | PVC Comp 1 | PVC Comp 2 | PVC Comp 3 |
| Viscosity (cP) | 87.2 | 51.8 | ND | 49.2 | 49.4 | ND |
| Dry time (min) | 3.8 | 5.0 | ND | 2.5 | 2.4 | ND |
| Hardness-Shore A | 91.6 | 92.6 | 95.7 | 88.3 | 88.1 | 91.2 |

Wire insulation requires high permanence of plasticizers in PVC. Loop spew test is commonly used to study the exudation tendency of plasticizers within polymeric matrix. As shown in Table 5, both Comp 1 and 2 exhibited good compatibility with PVC, and no signs of exudation was observed after the 7 days testing period.

TABLE 5

Loop spew exudation results of PVC films formed from the PVC dry blends

| | PVC Formulations Used to Make Films | | | |
|---|---|---|---|---|
| Time | Compar PVC Comp 1 | Compar PVC Comp 2 | PVC Comp 1 | PVC Comp 2 |
| 4 hours | 0 | 0 | 0 | 0 |
| 1 day | 0 | 0 | 0 | 0 |
| 7 days | 0 | 0 | 0 | 0 |

0 = no exudation,
1 = slight exudation,
2 = moderate exudation,
3 = severe exudation With their high efficiency and good heat aging performances, the plasticizer compositions disclosed in this application show unexpected potential in high temperature rating wire and cable products. The aging results are shown in Table 6. Both films formed from PVC Comp 1 and 2 passed UL 83 requirement for 90° C. rating with a good margin. Moreover, films formed from PVC Comp 2, which contains a higher ration of Ex 1-2, shows significantly improved heating aging performance. The increased performance is believed to be due to Ex 1-2 because of its highest molecular weight relative to Ex 1-1 and Ex 1-3 and therefore a higher concentration of DBTP can effectively reduce volatility of the plasticizer compound. One can further fine tune the heat aging and other performances by adjusting the ratios of Ex 1-1, Ex 1-2, and Ex 1-3, which in the case of a one pot reaction can be accomplished by adjusting the mole ratio of DB and 2EH alcohols during the reaction to form the plasticizer compositions.

Regarding the films formed from PVC Comp 3, this formulation contains a 1:1 mixture of Comp 2 and TOTM. The aged samples when subjected to 136° C. for 7 days, readily passes the 105° C. temperature rating.

TABLE 6

Physical properties of PVC films before and after aging in a forced air convection oven at 121° C. or 136° C. for 7days.

| | PVC Formulation Used to Make Film | | | | |
|---|---|---|---|---|---|
| Property | Compar PVC Comp 1 121° C./ 7 days | Compar PVC Comp 1 121° C./ 7 days | PVC Comp 1 121° C./ 7 days | PVC Comp 2 121° C./ 7 days | PVC Comp 3 136° C./ 7 days |
| Initial tensile strength (MPa) | 23.1 | 22.1 | 22.7 | 22.5 | 22.4 |
| Aged tensile strength (MPa) | 18.5 | 21.7 | 22.0 | 21.2 | 21.2 |
| Tensile strength retention % | 80.1 | 98.2 | 96.9 | 98.6 | 94.6 |
| Initial elongation at break % | 243 | 232 | 240 | 238 | 214 |
| Aged elongation at break % | 64 | 221 | 186 | 224 | 175 |
| Elongation retention % | 26.3 | 95.2 | 78.6 | 94.1 | 81.8 |

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following claims.

What is claimed is:

1. A plasticizer composition comprising:
greater than 40 wt % of a compound of formula I:

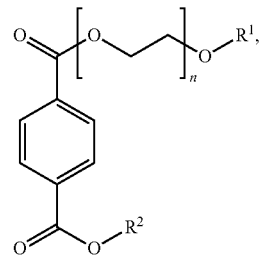

greater than 40 wt % of a compound of formula II

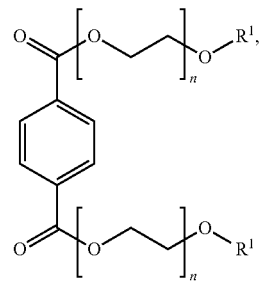

and 5 to 15 wt % of a compound of formula III:

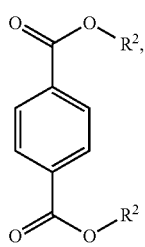

wherein:
- each $R^1$ is independently an unbranched or branched $(C_{1-9})$alkyl;
- each $R^2$ is independently an unbranched or branched $(C_3-9)$alkyl; and
- each n is independently 1, 2 or 3.

2. The plasticizer composition of claim 1, wherein: each $R^2$ is independently chosen from propyl, butyl, pentyl, hexyl, heptyl, octyl, or nonyl.

3. The plasticizer composition of claim 2, wherein: each $R^2$ is independently chosen from butyl, octyl, or nonyl.

4. The plasticizer composition of claim 1, wherein: each $R^1$ is independently chosen from methyl, ethyl, propyl, butyl, pentyl, hexyl, heptyl, octyl, or nonyl.

5. The plasticizer composition of claim 4, wherein each $R^1$ is independently chosen from butyl, octyl or nonyl.

6. The plasticizer composition of claim 1, wherein:

the compound of formula I is

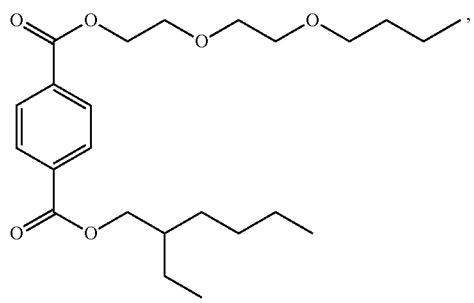 [SMILES: CCCCOCCOCCOC(=O)c1ccc(C(=O)OCC(CC)CCCC)cc1]

the compound of formula II is

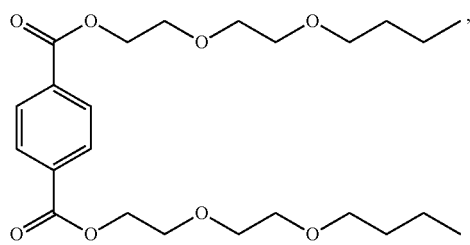 [SMILES: CCCCOCCOCCOC(=O)c1ccc(C(=O)OCCOCCOCCCC)cc1]

and the compound of formula III is

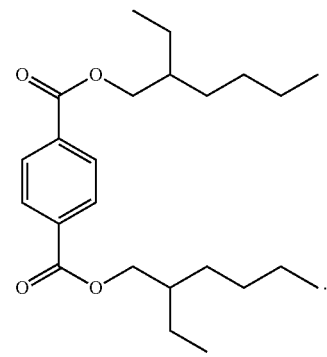 [SMILES: CCCCC(CC)COC(=O)c1ccc(C(=O)OCC(CC)CCCC)cc1]

7. A resin composition comprising:
(I) a resin; and
(II) a plasticizer composition comprising:
greater than 40 wt % of a compound of formula I:

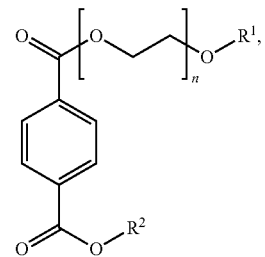

greater than 40 wt % of a compound of formula II:

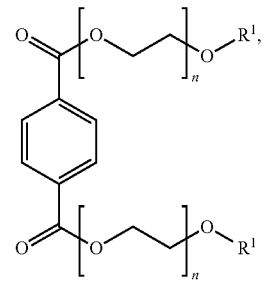

and
5 to 15 wt % of a compound of formula III:

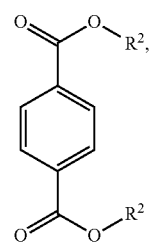

wherein:
each $R^1$ is independently $(C_{1-9})$alkyl;
each $R^2$ is independently $(C_{3-9})$alkyl; and
each n is independently 1 or 2.

8. The resin composition of claim 7, wherein:
the compound of formula I is

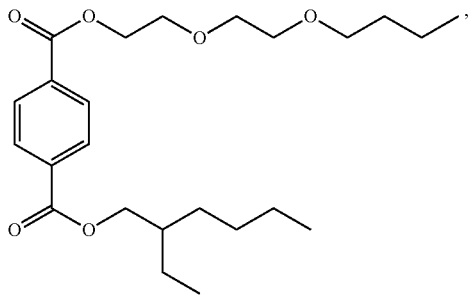 [SMILES: CCCCOCCOCCOC(=O)c1ccc(C(=O)OCC(CC)CCCC)cc1]

the compound of formula II is

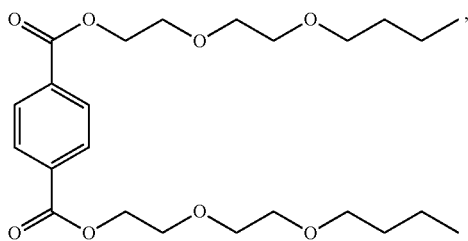 [SMILES: CCCCOCCOCCOC(=O)c1ccc(C(=O)OCCOCCOCCCC)cc1]

and
the compound of formula III is

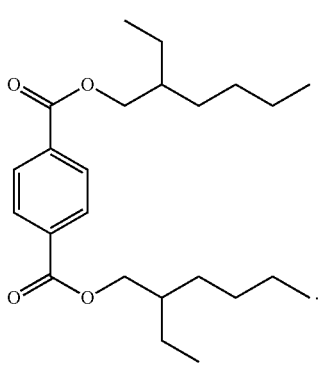 [SMILES: CCCCC(CC)COC(=O)c1ccc(C(=O)OCC(CC)CCCC)cc1]

9. The resin composition of claim 7, wherein the resin composition further comprises a stabilizer which is a primary antioxidant.

10. The resin composition of claim 9, wherein the primary antioxidant is present from 0.05 to 0.3 phr relative to the sum total of the resin.

11. The resin composition of claim 10, wherein the primary antioxidant is a phenolic antioxidant.

12. The resin composition of claim 11, wherein the phenolic antioxidant is chosen from
(1) tris(4-tert-butyl-3-hydroxy-2,6-dimethylbenzyl) isocyanurate;
(2) 2,2'-methylenebis(4-methyl-6-tert-butylphenol);
(3) 2,2'-methylenebis(4-ethyl-6-tert-butylphenol);
(4) 1,3,5-trimethyl-2,4,6-tris(3,5-di-tert-butyl-4-hydroxybenzyl) benzene;
(5) 3,3',3',5,5',5'-hexa-tert-butyl-a,a',a'-(mesitylene-2,4,6-triyl)tri-p-cresol;
(6) ethylene bis(oxyethylene) bis-(3-(5-tert-butyl-4-hydroxy-m-tolyl)propionate);
(7) hexamethylene bis[3-(3,5-di-tert-butyl-4-hydroxyphenyl)propionate];
(8) pentaerythritol tetrakis(3-(3,5-di-tert-butyl-4-hydroxyphenyl)propionate);
(9) thiodiethylene bis[3-(3,5-di-tert-butyl-4-hydroxyphenyl)propionate];
(10) octadecyl 3-(3,5-di-tert-butyl-4-hydroxyphenyl)propionate;
(11) N,N'-1,6-hexanediylbis[3,5-bis(1,1-dimethylethyl)-4-hydroxy-benzenepropanamide;
(12) phosphonic acid, [[3,5-bis(1,1-dimethylethyl)-4-hydroxyphenyl]methyl]-, monoethyl ester, calcium salt (2:1);
(13) 1,3,5-tris(3,5-di-tert-butyl-4-hydroxybenzyl)-1,3,5-triazine-2,4,6(1H,3H,5H)-trione; or
(14) 1,1,3-tris(2-methyl-4-hydroxy-5-tert-butylphenyl) butane.

13. The resin composition of claim 12, wherein the phenolic antioxidant is 1,1,3-tris(2-methyl-4-hydroxy-5-tert-butylphenyl)butane.

14. The resin composition of claim 7, wherein the resin comprises a polyvinyl chloride, a polyvinyl acetate, an acrylic polymer, vinyl chloride-containing copolymers or combinations thereof.

15. The resin composition of claim 14, wherein the resin comprises a polyvinyl chloride.

16. The resin composition of claim 7, further comprising other components chosen from a filler, a flame retardant, another stabilizer, a pigment, a processing aid, another plasticizer, or combinations thereof.

17. The resin composition of claim 16, wherein the filler comprises calcium carbonate, fly ash, or combinations thereof, and wherein the stabilizer comprises a metal soap, an epoxidized oil, an epoxidized fatty acid ester, an organo-tin compound, or combinations thereof.

18. The resin composition of claim 7, wherein when the resin composition is molded into 0.762 mm thick die C cut specimen and exposed to a temperature of 136° C. for 168 hours, in an atmosphere of circulated air as tested according to UL 2556, has a tensile strength retention of at least 80%, as compared to that of an unexposed control of the same composition and shape, wherein the tensile strength is determined according to ASTM D 412 at a 500 mm/min pulling rate.

19. The resin composition of claim 7, wherein the resin composition has a dry time of less than 3 min as measured according to ASTM 2396-94.

20. The resin composition of claim 7, wherein when the resin composition is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate.

* * * * *